United States Patent [19]

Bieber

[11] 4,118,999
[45] Oct. 10, 1978

[54] AUTOMATIC TRANSMISSION SHIFTER

[76] Inventor: William J. Bieber, 21901 Adler Dr., California City, Calif. 93505

[21] Appl. No.: 732,881

[22] Filed: Oct. 15, 1976

[51] Int. Cl.² ............................................. G05G 7/08
[52] U.S. Cl. ...................................... 74/475; 74/476; 74/538
[58] Field of Search ............. 74/475, 538, 476, 473 R

[56] References Cited

U.S. PATENT DOCUMENTS

| Re. 26,884 | 5/1970 | Hurst, Jr. et al. | 74/473 |
| 1,708,145 | 4/1929 | McGraw | 74/538 |
| 2,926,762 | 3/1960 | Edgley | 74/473 X |
| 3,491,612 | 1/1970 | Adahan | 74/473 |
| 3,520,208 | 9/1970 | Davis et al. | 74/538 X |
| 3,570,320 | 3/1971 | MacAfee et al. | 74/473 |
| 3,757,600 | 9/1973 | Bieber | 74/473 |
| 3,941,008 | 3/1976 | Cambria | 74/473 |
| 4,028,959 | 6/1977 | Long | 74/473 |

Primary Examiner—Irwin C. Cohen
Attorney, Agent, or Firm—Howson & Howson

[57] ABSTRACT

A shifter is provided for an automatic transmission to enable a drive to upshift rapidly from first through to drive speed ranges during racing. The shifter includes a frame plate having a shaped aperture which provides a series of surfaces arranged in a predetermined pattern to guide a selector pin in a prearranged path during motion of a shift handle which is pivotally connected to the frame plate. The surfaces arrest motion of the handle at the completion of an upshift from one range to another to prevent inadvertent overshifting of the transmission during rapid upshifting.

18 Claims, 4 Drawing Figures

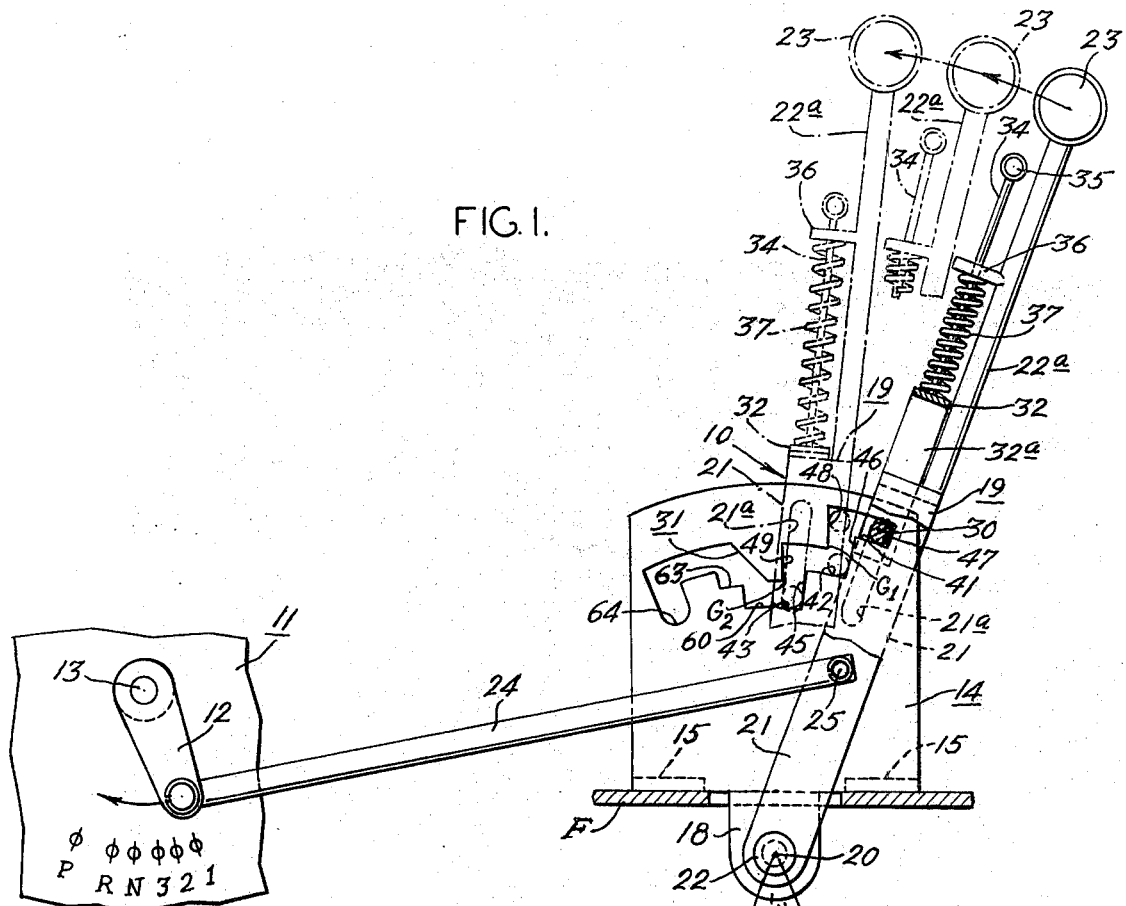
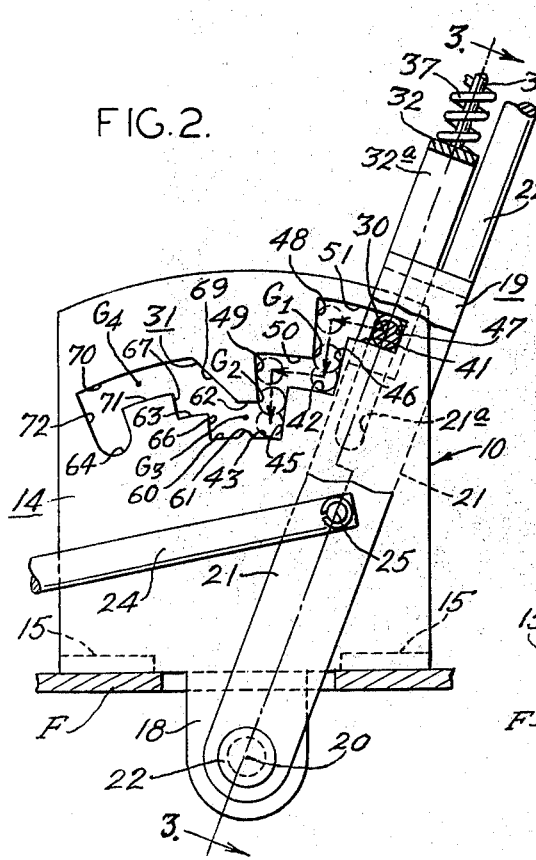
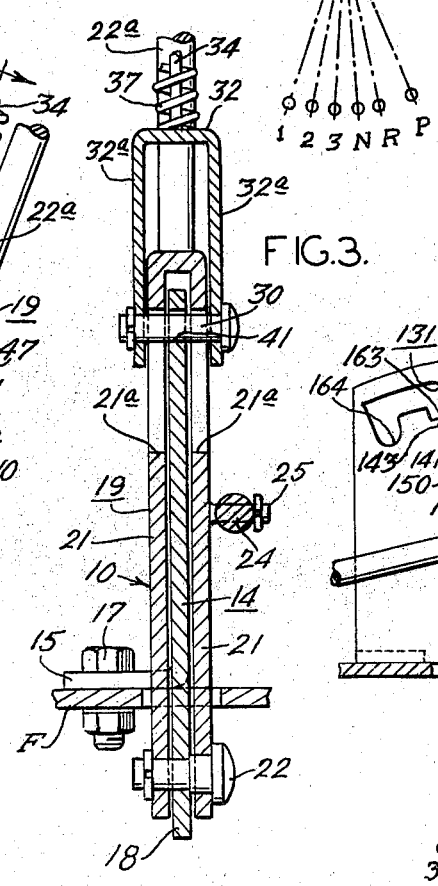
FIG. 1. FIG. 2. FIG. 3. FIG. 4.

AUTOMATIC TRANSMISSION SHIFTER

The present invention relates to automatic transmission shifters, and more particularly, the present invention relates to automatic transmission shifters which are designed to permit rapid and accurate upshifting of an automatic transmission.

Several different shifters for automatic automobile transmissions are known. Examples of such shifters may be found in U.S. Pat. No. Re. 26,884; U.S. Pat. Nos. 3,570,320; and 3,941,008. Although each of these patented shifters may function satisfactorily for its intended purpose, each is relatively complicated and hence expensive to manufacture.

In my U.S. Pat. No. 3,757,600, there is disclosed several embodiments of an automatic transmission shifter having racing mode and street mode capabilities. Although each of these shifters functions satisfactorily, there is a demand for a simple shifter which has a minimum of parts and which can be manufactured economically with a minimum of labor and materials.

With the foregoing in mind, it is the primary object of the present invention to provide a simple automatic transmission shifter which has a minimum of parts and which, therefore, can be produced economically.

It is another object of the present invention to provide an improved automatic transmission shifter which enables an automatic transmission to be upshifted quickly and accurately during racing without any complicated hand motions.

As a further object, the present invention provides a unique automatic transmission shifter which is designed to be manufactured without adhering to close manufacturing tolerances and which, therefore, can be manufactured by high-speed mass-production techniques.

More specifically, the present invention provides a shifter for use with an automatic transmission having conventional forward speed ranges including first, second and drive to shift the transmission rapidly during racing. The shifter comprises an upstanding frame plate which pivotally mounts an upwardly protruding handle. The frame plate has a shaped aperture which provides a series of surfaces which are engaged by a selector pin mounted in a trigger assembly carried by the handle to arrest the forward motion of the handle when it is pushed rapidly from a lower speed range position into a higher speed range position during an upshift. At the completion of the upshift, the aperture surfaces cooperate to position the selector pin in the proper position for the succeeding upshift.

A modified embodiment is disclosed for automatic transmissions having reverse shift patterns.

These and other objects, features and advantages of the present invention should become apparent from the following description when taken in conjunction with the accompanying drawing, in which:

FIG. 1 is a view in side elevation of an automatic transmission shifter embodying the present invention, the view illustrating in full lines the position of the shifter handle at the start of an upshift from the first speed range and illustrating in broken lines different positions of the shifter handle and selector pin during succeeding upshifts;

FIG. 2 is an enlarged fragmentary view of the shifter illustrated in FIG. 1;

FIG. 3 is a sectional view taken on line 3—3 of FIG. 2; and

FIG. 4 is a fragmentary side elevational view similar to FIG. 2 but illustrating a shifter for use with an automatic transmission having a reverse shift pattern.

Referring now to FIG. 1, an automatic transmission shifter 10 embodying the present invention is provided for an automatic automobile transmission 11 having a conventional forward shift pattern. As best seen therein, the transmission 11 has a shift arm 12 which is mounted to a shaft 13 to privot in the clockwise direction indicated by the arrow from a first forward speed range 1, through a second forward speed range 2, into a third or drive speed range 3. Continued pivotal movement of the shift arm 12 causes the transmission 11 to shift into neutral N, reverse R, and park P positions.

In accordance with the present invention, the shifter 10 is designed to enable the shift arm 12 to be positioned rapidly and accurately in each of the forward range positions during rapid upshifting such as when racing. The shifter 10 is also designed for street use in a conventional manner without requiring any change-over from a racing mode to a non-racing mode of operation. To this end, the shifter 10 comprises frame means which, in the illustrated embodiment, includes an upstanding plate 14 having laterally-turned flanges 15,15 at its lower end each of which is secured to an automobile floor F by a bolt 17. The lower end of the frame plate 14 has a tab 18 which depends below the flanges 15 to mount a handle assembly 19 to pivot about a horizontal axis 20. As a result, the overall height of the shifter is kept to a minimum, thereby minimizing the space needed to install the shifter in a automobile.

The handle asembly 19 comprises leg means 21 which, as best seen in FIG. 3, comprises a pair of legs 21,21 which extend upwardly alongside the plate 14 and which are pivotally connected to the plate tab 18 by a connecting pin 22. The legs 21,21 are integral and span across the upper edge of the frame plate 14 where they are connected to an upstanding elongated rod 22a which mounts a hand grip 23 at its upper end. The handle assembly 19 is adapted to be connected to the transmission shift arm 12 by an elongated operating rod 24 which is pivotally connected to a stud 25 protruding outwardly from one of the handle legs 21. Thus, pivotal movement of the handle assembly 19 in the directin of the arrow in FIG. 1 causes the operating rod 24 to pivot the shift arm 12 in the clockwise direction from the first to the third speed range positions. If desired, a conrol cable may be provided in lieu of the rod 24 to connect the shifter handle 21 to the transmission shift arm 12.

According to the present invention, the shifter 10 functions to position the shift arm 12 accurately by causing the motion of the handle assembly 19 to be arrested at the completion of an upshift when pivoted rapidly from the full line position in FIG. 1 and into the two broken line positions illustrated therein. For this purpose, selector pin means 30 is mounted for movement with the handle assembly 19 in a predetermined path defined by surfaces forming an aperture 31 in the frame plate 14. In the illustrated embodiment, the selector pin means 30 is provided by a cylindrical pin which is mounted in a yoke 32 having a pair of legs 32a,32a depending in spaced relation alongside the handle legs 21,21. The selector pin 30 is mounted at the lower ends of the yoke legs 32a,32a and extends through a pair of radially-extending elongated slots 21a,21a in the handle legs 21,21.

Trigger means is provided on the front of the handle assembly 19 to displace the selector pin 30 in the slots 21a,21a. As best seen in FIG. 1, the trigger means includes a rod 34 connected at its lower end to the upper end of the yoke 32 and a trigger grip 35 mounted at the upper end of the rod 34. The rod 34 is slidably received in a forwardly-protruding web 36 on the front of the handle rod 22a. In the present instance, a compression spring 37 is mounted between the web 36 and the upper end of the pin yoke 32 to bias the selector pin 30 in a downward direction toward a pivot axis 20 of the handle assembly 19.

The selector pin 30 travels in a tortuous path as the handle assembly 19 moves through the three positions illustrated in FIG. 1 corresponding to the first, second and third speed ranges of the transmission shift arm 12. To this end, the plate aperture 31 has an arcuate locator surface 41 corresponding to the first forward range, an arcuate locator surface 42 corresponding to the second forward range, and an arcuate locator surface 43 corresponding to the third forward range. The arcuate locator or tread surfaces 41-43 are located at different radial levels relative to the pivot axis 20 of the handle assembly 19. For instance, the first locator surface 41 is located the furthest from the pivot axis 20, the third locator surface 43 is located closest to the pivot axis 20, and the second locator surface 42 is located intermediate the first and second locator surfaces 41 and 43. The third locator surface 43 is positioned counterclockwise of the second locator surface 42 which in turn is positioned counterclockwise of the first locator surface 41.

The selector pin 30 travels in a downward direction during upshifting and is positioned on the locator surface 42 at the completion of the upshift to second and on the locator surface 43 at the completion of the upshift to third. For this purpose, the third range locator surface 43 is connected to the second range locator surface 42 by a rearward abutment surface or riser 45. The second range locator surface 42 is connected to the first range locator surface 41 by another rearward abutment surface or riser 46. A third rearward abutment surface 47 extends upwardly from the first locator surface 41. Each of the rearward abutment surfaces 45, 46 and 47 extends on a line drawn radially outward from the pivot axis 20 of the handle assembly 19. Thus, the locator surfaces cooperate with their associated rearward abutment surfaces to define bights at their intersections which function to position the selector pin 30 accurately relative to the plate and to limit the rearward motion of the handle assembly 19 during downshifting from the third forward range to the first forward range.

In order to arrest motion of the handle assembly 19 at the completion of an upshift, a forward abutment surface is disposed transversely to the path of movement of the selector pin 30 at each locator surface level. As best seen in FIG. 2, a forward abutment surface 48 extends toward the handle pivot axis 20 in spaced relation with the rearward abutment surface 46 to define therbetween a gate $G_1$ affording passage of the selector pin 30 in a downward direction onto the second locator surface 42. Another forward abutment surface 49 is similarly located with respect to the rearward abutment surface 45 to define another gate $G_2$ affording passage of the selector pin 30 in the downward direction onto the third locator surface 43. It is noted that the rearward abutment surfaces 45 and 46 extend radially outward from the pivot axis 20; whereas, the forward abutment surfaces 48 and 49 are each inclined at an angle of about 7° with respect to their associated rearward abutment surfaces. The slots 21a,21a in the handle legs also extend radially outward from the pivot axis 20. The acute angular relation between the forward abutment surfaces and the slots 21a,21a prevents the selector pin from falling through the gates until pessure on the handle is relieved at the end of each upshift.

The first and second locator surfaces 41 and 42 terminate in spaced relation with their associated forward abutment surfaces 48 and 49, and the selector pin 30 is accelerated downwardly by biasing means including gravity and the force applied by the spring 37 as soon as the pin leaves each locator surface 41 and 42. In order to ensure engagement of the selector pin 30 by the forward abutment surfaces 48 and 49, the forward abutment surfaces depend below the levels of their associated locator surfaces 41 and 42, respectively. As best seen in FIG. 2, the lower portions of the abutment surfaces 48 and 49 overlap the rearward abutment surfaces 46 and 45 a distance corresponding substantially to the diameter of the selector pin 30. This overlap and the distance between the locator surfaces 41, 42 and 43 determines the distance the selector pin 30 must travel between upshifts. When coupled with the biasing force applied by the spring 37, this dimensional relation determines the speed with which the handle must be pivoted to ensure that the selector pin engages the forward abutment surfaces rather than falling through the gates $G_1$ and $G_2$ without striking the forward abutment surfaces.

Upward movement of the selector pin 30 is controlled by the limit surface 50 which connects the forward abutment surfaces 48 and 49 and which extends in spaced relation with the second locator surface 42 a distance slightly greater than the diameter of the selector pin 30. A similarly-extending limit surface 51 connects the forward abutment surface 48 with the rearward abutment surface 47 and is spaced from the first locator surface 41 by a distance slightly greater than the diameter of the selector pin 30. Thus, the aperture 31 has a reversed Z-like stepped configuration which forms a predetermined vertical serpentine path through which the selector pin 30 must pass during upshifting.

In operation, at the start of an upshift, the handle assembly 19 is placed in the full line position illustrated in FIG. 1. When so positioned, the selector pin 30 is engaged on the first locator surface 41, and the transmission shift arm 12 is in its rearwardmost position corresponding to the first speed range 1. When the handle assembly 19 is advanced rapidly in the direction indicated by the arrow in FIG. 1, the selector pin 30 engages the forward abutment surface 48 before it can drop through the gate $G_1$, and the forward motion of the handle assembly 19 is arrested. As long as forward pressure is maintained on the hand grip 33, the selector pin 30 remains engaged with the forward abutment surface 48 at a level slightly below the level of the first locator surface 41. The transmission is thus placed in its second speed range 2. When pressure on the hand grip 33 is relieved slightly, the coil spring 37 urges the yoke 32 and the selector pin 30 downwardly through the gate $G_1$ and onto the second locator surface 42 to prepare the shifter 10 for the succeeding upshift into the third speed range. When the handle assembly 19 is again pivoted forwardly into the second broken line position, the selector pin 30 engages the forward abutment surface 49, and the forward motion of the handle assembly 19 is arrested. The transmission is then placed in the third or drive range. When pressure on the handle assembly 19 is again released, the spring 37 urges the selector pin 30 downwardly through the gate $G_2$ and onto the third locator surface 43.

It is the rapid motion of the selector pin 30 across the gap between arcuate locator surfaces 41 and 42 and the forward abutment surfaces 48 and 49 that prevents the selector pin 30 from dropping through the gates $G_1$ and $G_2$. The rearward inclination of the forward abutment surfaces 48 and 49 engages the selector pin 30 at a level slightly below the levels of the locator surfaces unitl such time as pressure on the handle assembly 19 is relieved at the completion of an upshift to enable the spring force acting on the selector pin 30 to displace the selector pin downwardly through the gates $G_1$ and $G_2$.

When the shifter handle 19 is pivoted in the direction of the arrow in FIG. 1 at a slower rate, such as during street driving, the selector pin 30 simply falls from the locator surfaces 41 and 42 and slides downwardly along the rearward abutment surfaces 46 and 45 and onto the locator surfaces 42 and 43 without engaging the forward abutment surfaces 48 and 49, respectively.

In order to reposition the shifter handle 19 in the first range position at the beginning of an upshift, the trigger grip 35 is pulled upwardly to compress the compression spring 37 and to raise the selector pin 30 upwardly in the slots 21a,21a in the handle legs 21,21. The limit surfaces 50 and 51 limit the upper motion of the selector pin 30 during its upward movement as the handle is being downshifted. It is noted that if a continuous upward pressure is maintained on the trigger grip 35, the transmission may be accurately and rapidly downshifted by pulling the handle assembly 19 in the reverse direction to cause the selector pin 30 to move in the direction opposite the arrows indicated in FIG. 2.

The shifter 10 is also designed to enable the shift arm 12 to be placed in the neutral (N), reverse (R) and park (P) positions. For this purpose, the frame plate 14 has a neutral locator surface 60 disposed forward of the third locator surface 43 and at the same level. The neutral and third locator surfaces 60 and 43, respectively, are separated by an upwardly-protruding detent 61. A guide surface 62 partially overlies the locator surfaces 60 and 43 and cooperates therewith, and with the detent 61, to define a horizontal gate $G_3$ affording passage of the selector pin 30 between the neutral and third positions.

The reverse locator surface 63 is disposed at a higher level than the neutral locator surface 60 and forwardly thereof. The park locator surface 64 is provided by an upwardly-open pocket located forwardly of the neutral locator surface 63. A second horizontal gate $G_4$ affords passage of the selector pin 30 between the park and reverse locator surfaces. Radially-extending abutment surfaces 66 and 67 are located forward of the neutral and reverse locator surfaces 60 and 63, respectively, to limit forward motion of the selector pin 30. An upwardly and forwardly inclined limit surface 69 connects the horizontal gate surface 62 with an upper limit surface 70 which cooperates with a parallel lower limit surface 71 therebelow to form the second gate $G_4$. Another forward abutment surface 73 extends upwardly from the bottom of the recess 64 to the upper limit surface 70.

By virtue of this structure, the transmission can be placed in neutral simply by pushing the handle assembly 19 forwardly from the third range position to cause the selector pin 30 to pass through the horizontal gate $G_3$. The transmission can be placed in reverse by pulling upward on the trigger 35 while pushing the handle forward to place the selector pin 30 on the reverse locator surface 63. The transmission can be placed in park by pulling further upward on the trigger 35 and pushing the handle forward to cause the pin 30 to pass through the horizontal gate $G_4$, whereupon the trigger 35 can be released to enable the pin 30 to drop into the park pocket 64.

Thus, it should be apparent that the present invention provides a shifter assembly 10 which is responsive to the angular velocity of the shifter handle 19 to prevent overshifting. The shifter 10 functions to prevent overshifting when the handle is pushed rapidly, such as during racing, but does not significantly interfere with the normal shifting action such as when the shifter handle is pushed only as in conventional street driving.

A modified embodiment of the present invention which is particularly suited for use in conjunction with a transmission having a reverse shifting pattern is illustrated in FIG. 4. As best seen therein, the modified shifter 110 has a frame plate 114 with a shaped aperture 131 providing surfaces for interacting with the selector pin 130 of the shifter handle assembly 119 to arrest the motion of the handle assembly 119 at the proper location as the handle assembly 119 is pivoted in the clockwise direction indicated in FIG. 4. In this embodiment, the forward direction is indicated by the arrow in FIG. 4, even though this would be toward the rear of the automobile in which the shifter 110 is installed.

In this embodiment, the locator surface 141 corresponding to the first speed range is slightly recessed to provide a detent to maintain the handle in the full line position. The forward abutment surface 148 associated with the first locator surface 141 cooperates with a guide surface 148a to define a gate $G_1$ affording downward movement of the selector pin 130 onto the second range locator surface 142 located below the gate at $G_1$. In this embodiment, the third locator surface 143 is disposed at substantially the same level as the second locator surface 142, and its forward abutment surface 149 extends transversely thereto in a generally radially outward direction therefrom. It is noted that the second locator surface 142 is recessed slightly below the level of the third locator surface 143 to maintain the selector pin 130 and the handle assembly 119 in the second range position during the course of upshifting.

In order to enable the shifter 110 to be rapidly shifted directly from the third range position to the neutral position in the event of an emergency requiring a rapid placement of the transmission in neutral, a rear abutment surface 150 is spaced from the abutment surface 149, and a neutral position locator surface 151 extends away from the second locator surface 142 at the same level as the third locator surface 143. The neutral abutment surface 150 functions to engage the selector pin 130 to arrest the motion of the handle assembly 119 in the reverse direction (opposite the direction of the arrow) and thereby to permit the transmission to be shifted into neutral without inadvertently being upshifted into reverse.

The embodiment of FIG. 4 is structurally similar to the embodiment of FIG. 1. For instance, the handle assembly 119 is similar. The shape of the aperture 131 providing the neutral, reverse and park locator surfaces, 160, 163 and 164, respectively, is also similar.

It is noted that in this embodiment the frame plate 114 has two neutral locator surfaces, the second one 143 being located above the first one 151. A shallow protrusion 161 is provided between the second neutral locator surface 143 and the first locator surface 141. As in the first embodiment, the abutment surface 148 is inclined at an angle of about 7° with respect to a radial line from the pivot axis of the handle assembly 119. The operation of the shifter 110 is similar to the operation of the shifter 10, except of course, that during up-shifting, the handle assembly 119 is pivoted in the opposite direction from the handle assembly 19. Thus, for automatic transmissions having so-called reverse shift patterns, the shifter assembly 119 functions to provide rapid and accurate upshift capabilities.

In view of the foregoing, it should be apparent that the present invention provides improved automatic transmission shifters capable of quickly and accurately upshifting automatic transmissions. The shifters have a minimum of moving parts and are, therefore, economical to produce. For instance, the heart of each shifter is its frame plate and the shaped aperture therein. The frame plate can produced economically because it can be punched from sheet steel in a press. Since the shifters do not require close tolerances to perform satisfactorily, the shifters may be manufactured on high-speed presses.

While preferred embodiments of the present invention have been described in detail, various modifications, alterations and changes may be made without departing from the spirit and scope of the present invention as defined in the appended claims.

I claim:

1. A shifter for an automatic transmission having at least first, second and third speed ranges, said shifter comprising:
   a frame means adapted to be mounted in a vehicle;
   a handle mounted to said frame means for pivotal movement about an axis between first, second and third positions corresponding to said first, second and third speed ranges;
   selector pin means moveable about said axis in response to pivotal movement of said handle;
   locator surface means on said frame means at said handle positions engageable by said selector pin means to dispose said handle in said positions, said locator surface means including a first surface at one level for said first position, a second surface at a different level for said second position;
   forward abutment surface means extending on said frame means transversely to each of said first and second position locator surfaces and depending below the level of said first and second locator surfaces so as to be disposed in the path of movement of said selector pin means for engaging said selector pin means after it leaves the first and second locator surfaces at the completion of rapid upshifts to arrest forward motion of the handle;
   rearward abutment surface means on said frame means cooperating with said forward abutment and locator surface means to define gates affording passage of said selector pin means in the reverse direction;
   biasing means acting on said selector pin means to urge said selector pin means into engagement with said locator surfaces and operable at the completion of an upshift to displace said pin means positively through said gates; and
   trigger means carried by said handle for displacing said selector pin means against its bias to afford placement of said handle in selected ones of its shift positions.

2. A shifter according to claim 1 including means coupling said selector pin means to said handle to afford movement of said selector pin means in a predetermined direction from said first and second levels and wherein said forward abutment surface means extends rearwardly at an angle relative to said predetermined direction between said levels for cooperating with said coupling means to enable said selector pin means to be maintained in engagement with said forward abutment surface means as long as pressure is maintained on the handle at the completion of an upshift.

3. A shifter according to claim 2 wherein said frame means includes a plate having said locator and abutment surface means thereon, and said coupling means for said selector pin means includes leg means extending alongside said plate and having an elongated slot slidably receiving said selector pin means to mount said selector pin means for movement radially relative to said handle pivot axis.

4. A shifter according to claim 3 wherein said frame plate has an aperture with a predetermined configuration providing said locator and abutment surface means thereon, and said trigger means includes yoke means mounting said selector pin means for movement both in said slot in said handle leg means and in said plate aperture.

5. A shifter according to claim 4 wherein said biasing means includes an elastic element connected to said yoke means and said handle for urging said selector pin means in said slot, and said trigger means includes a grip connected to said yoke means and mounted to said handle for movement relative thereto for displacing said yoke means and said selector pin means against the biasing force of said elastic element.

6. A shifter according to claim 1 wherein said locator surface means includes a third locator surface for said third position disposed at a level different from said first and second locator surface levels, said first and second locator surfaces terminating in spaced relation with respect to each of their associated forward abutment surface means.

7. A shifter according to claim 6 wherein said second locator surface level is closer to said handle pivot axis than said first surface level, said third locator surface level is closer to said handle pivot axis than said second locator surface level, and said forward abutment surface means extends along at least a portion of each said rearward abutment surface means in spaced relation therewith to define a pair of vertically-spaced gates for said selector pin means.

8. A shifter according to claim 7 wherein said locator surfaces extend arcuately at said different levels and said rearward abutment surfaces extend radially to connect said locator surfaces.

9. A shifter according to claim 8 including means providing a limit surface extending on said frame means transversely to each of said abutment surfaces in spaced relation with said locator surfaces to engage said selector pin means when it is displaced against its bias by said trigger means during movement of said shift handle during downshifting.

10. A shifter according to claim 7 including locator surfaces on said frame means corresponding to neutral, reverse and park transmission settings, and means providing a horizontal gate between said third locator surface and said neutral locator surface to afford passage therethrough of said selector pin means.

11. A shifter according to claim 10 wherein said neutral and third locator surfaces are disposed at substantially the same level and are separated by an upwardly-protruding detent located therebetween.

12. A shifter according to claim 10 wherein said frame means has an upwardly-open pocket providing said park locator surface forward of said reverse locator surface, and including means providing a second horizontal gate between said pocket and said reverse locator surface to afford passage of said selector pin means into and out of said pocket.

13. A shifter according to claim 1 including means mounted on said handle for connecting said handle to a transmission shift arm.

14. A shifter according to claim 1 wherein said frame means includes a plate having laterally-turned mounting flange means and a tab depending below said flange means for pivotally mounting said handle.

15. A transmission shifter, comprising: a frame plate having an aperture with a predetermined configuration, a selector pin moveable in said plate aperture, a shift handle pivotally mounted to said frame plate, means coupling said selector pin to said shift handle to enable said selector pin to move toward the handle pivot axis in said aperture in response to movement of said shift handle, said plate aperture having at least first and second locator surfaces at different levels relative to the pivot axis of said handle and having substantially radial forward and rearward spaced surfaces cooperating with each locator surface to define forwardly thereof a vertical gate affording downward motion of said selector pin to a lower level when said handle is pivoted forwardly, means biasing said selector pin towards said first and second locator surfaces, said substantially radial forward surfaces depending below the level of said first and second locator surfaces and being disposed in the path of movement of said selector pin means after it leaves one of said locator surfaces at the completion of an upshift, and trigger means connected to said pin coupling means and said handle to afford upward movement of said selector pin through the gate when said handle is pivoted rearwardly.

16. A shifter for an automatic transmission, comprising: a frame plate having an aperture with a predetermined configuration, a handle assembly mounted to said frame plate to pivot about an axis, said handle assembly having an elongated slot extending away from said axis and adapted to register with said plate aperture, selector pin means extending through said handle slot and plate aperture, and trigger means mounting said pin means for movement in said slot and along said handle, said plate aperture having a plurality of locator surfaces each disposed at a different level with respect to said handle pivot axis and having a plurality of forward abutment surfaces disposed transversely to said locator surfaces to define forward of each locator surface a vertical gate affording passage of said selector pin means toward said pivot axis from one locator surface level to another, means biasing said selector pin towards said first and second locator surfaces, said abutment surfaces depending below each locator surface level and being inclined rearwardly relative thereto to engage said selector pin means for preventing the selector pin means from dropping through the gate until forward pressure on the handle assembly is relieved at the completion of an upshift.

17. A shifter according to claim 16 wherein said frame plate has laterally-turned mounting flange means located adjacent its lower end and said frame plate has a tab depending below said mounting flange means, and including means pivotally mounting said handle assembly to said tab, whereby a shifter having a relatively low profile is provided.

18. A shifter according to claim 16 wherein said aperture has first, second and third locator surfaces disposed at different levels relative to the handle pivot axis, and said aperture has neutral and reverse locator surfaces disposed forward of said third locator surface and a pocket disposed forward of said reverse locator surface to provide a park position locator surface.

* * * * *